UNITED STATES PATENT OFFICE.

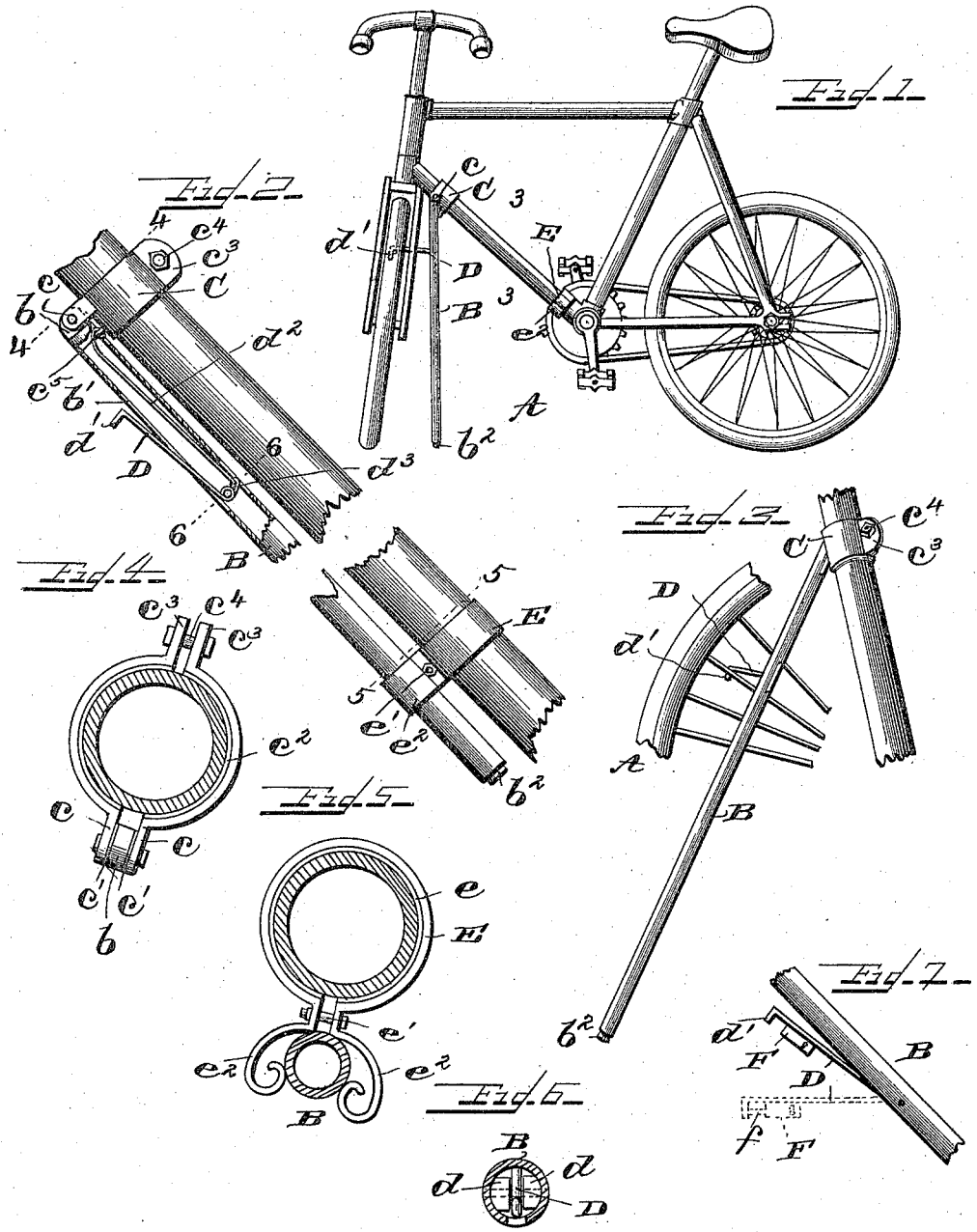
(No Model.)
C. L. BENEDICT.
BICYCLE SUPPORT.
No. 575,453. Patented Jan. 19, 1897.

CHARLES L. BENEDICT, OF AMHERST, CANADA.

BICYCLE-SUPPORT.

SPECIFICATION forming part of Letters Patent No. 575,453, dated January 19, 1897.

Application filed July 18, 1896. Serial No. 599,677. (No model.)

*To all whom it may concern:*

Be it known that I, CHARLES L. BENEDICT, a subject of the Queen of Great Britain, residing at Amherst, in the Province of Nova Scotia and Dominion of Canada, have invented certain new and useful Improvements in Bicycle-Supports; and I do hereby declare the following to be a full, clear, and exact description of the invention, such as will enable others skilled in the art to which it appertains to make and use the same.

My invention is an improvement in bicycle-supports; and it consists in the novel features hereinafter described, reference being had to the accompanying drawings, which illustrate one form in which I have contemplated embodying my invention, and said invention is fully disclosed in the following description and claims.

Referring to said drawings, Figure 1 represents a side view of a bicycle provided with my improved support, showing the support in operative position. Fig. 2 is an enlarged view, partly in section, of the lower inclined bar of a bicycle-frame, showing the device attached but in folded position. Fig. 3 is an enlarged view, taken on line 3 3 of Fig. 1, looking to the left. Fig. 4 represents an enlarged section on line 4 4 of Fig 2. Fig. 5 represents an enlarged section on line 5 5 of Fig. 2. Fig. 6 is an enlarged sectional view on line 6 6 of Fig. 2. Fig. 7 is a detail view of a portion of the device, showing the spoke-engaging hook provided with a locking device.

The support which forms the subject-matter of my invention comprises a supporting-rod adapted to be secured to the frame of any bicycle and having a hook or arm for engaging one of the spokes of the front wheel to prevent said wheel from turning. The wheel is turned somewhat, so as to stand angularly to the frame when the device is in operation, and the wheel is then supported upon three points in the relation to each other of the angles of a triangle, to wit, the points where the front and rear wheels rest upon the ground and the point where the support rests upon the ground.

In the drawings, A represents a bicycle of any ordinary construction.

B represents my improved support, which is preferably composed of a hollow rod or tube of brass, steel, rattan, bamboo, or any other suitable material which will be light and small in diameter and have the requisite strength. At one end said support has a reduced perforated ear or lug $b$, which has a hinge connection with suitable perforated ears $c\ c$ on a clamping ring or collar C, and I prefer to insert washers of rubber $c'\ c'$ between the parts of the hinge connection, as indicated in Fig. 4, to prevent noise or rattle when the device is not in use.

The clamping-collar C is preferably lined with leather, rubber, or some other soft material, as at $c^2$, to prevent scratching the enamel of the bicycle-frame, and it is also provided with perforated clamping-lugs $c^3\ c^3$, through which is passed a clamping-bolt $c^4$, by means of which the collar is secured upon the frame-bar. In clamping this collar upon the bar I prefer to set it at a slight angle, as indicated in Fig. 4, so that the bar will stand at an angle laterally to the machine when in operative position in order to give it the proper position. In this way it will always drop into the correct position when released from its support, hereinafter described.

D represents a hook-arm which is pivoted to the support, preferably within the same, as shown, and I prefer to place a rubber or other elastic cushion $d$ on either side of the hook at its point of pivoting, as shown in Fig. 6, to prevent rattle. The outer end of the arm D is provided with a hook $d'$, which engages one of the spokes of the front wheel when the device is in operative position and holds the wheel from movement. This hook-arm is adapted to fold up against the support B when not in use, and I prefer to provide said support with a longitudinal slot $b'$, so that the hook-arm, when in folded position, lies mainly within the support, as shown in Fig. 2.

In order that the hook-arm may be automatically folded up and extended for use, I provide a connecting-link $d^2$, preferably within the support B, which engages at one end a short arm $d^3$, connected with the hook-arm, (see Fig. 2,) and at the other a lug or projection $c^5$ on the collar C, by means of which this result is accomplished.

In order to hold the support firmly in engagement with the frame-bar and parallel thereto when not in use, I employ the device shown in detail in Fig. 5. This consists of a clamping-ring E, lined with rubber or other soft material $e$, adapted to be placed around the bar and secured by a clamping-nut $e'$. The end portions of the ring are extended and bent outwardly and then curved upwardly and inwardly to form spring-arms $e^2\ e^2$, within and between which the support B is held. The support may be placed in engagement with these spring-arms by simply pressing it between them, and it can be removed from engagement therewith by simply pressing it in the opposite direction either with the hand or foot. The outer end of the support B is preferably provided with a projecting portion or foot-piece $b^2$, of rubber, to give it a firm hold on the ground and to prevent slipping.

In some cases I prefer to provide the hook-arm with a locking device by means of which said arm may be locked to the spoke, thereby serving both as a support and a lock.

In Fig. 7 I have illustrated one form of hook-arm provided with a lock, in which the lock F is rigidly secured to said arm and provided with a bolt $f$, which in its outermost position engages the end of the hook $d'$ and thereby locks the spoke in engagement with the arm.

The lock may be of any desired construction and provided with a suitable key.

In operation the rider, when he wishes to have his machine supported, simply presses his hand or foot upon the support adjacent to the spring-arms $e^2\ e^2$, thereby removing it from the said arms and permitting it to fall. By reason of the collar C being placed angularly around the bar the support will fall into the desired position and the hook-arm will be thrown downwardly by means of its link to engage a spoke of the front wheel.

When the device is not desired, the operator will raise it from the ground with hand or foot, (when the hook will be disengaged from the wheel and folded within the support,) and the device is then pressed between the spring-arms $e^2\ e^2$, which are also secured upon the bar angularly to conform with the position of collar C, as shown in Fig. 5, and the device will then be entirely out of the way.

What I claim, and desire to secure by Letters Patent, is—

1. A bicycle-support comprising among its members an attaching device adapted to be detachably secured to the bicycle-frame, the hollow supporting-rod pivotally secured to said attaching device and provided with a longitudinal slot, a hook-arm pivoted with said rod adjacent to one end of said slot, and having its other end provided with a spoke-engaging hook, adapted to enter said slot and lie wholly within said hollow rod when the latter is not in operative position, a clip adapted to be detachably secured to the bicycle-frame, provided with spring-arms for holding said rod when not in use and means for forcing said hook within said hollow rod when the latter is moved out of operative position and into engagement with the said spring-arms, substantially as described.

2. A bicycle-support comprising among its members, a clamping-collar, the hollow supporting-rod hinged thereto a hook-arm pivoted within said rod, and having a spoke-engaging hook at its free end, said rod being provided with a longitudinal slot, to permit said hook to lie within said rod when out of operative position and a link connecting said hook-arm and said collar, substantially as described.

3. A bicycle-support comprising among its members a clamping-collar, the hollow supporting-rod hinged thereto, provided with a longitudinal slot, a hook-arm pivoted within said hollow rod and having a spoke-engaging hook at its free end, said hook-arm being adapted to lie within said hollow rod when the latter is not in operative position, a link connecting said hook-arm and said collar and a lock secured to the outer end of the hook-arm having a movable bolt, adapted to engage a portion of the hook to retain the spoke within said hook, substantially as described.

In testimony whereof I affix my signature in presence of two witnesses.

CHARLES L. BENEDICT.

Witnesses:
J. ROBSON DOUGLAS,
T. SHERMAN ROGERS.